United States Patent

Seigel

[15] 3,636,435
[45] Jan. 18, 1972

[54] METHOD OF ELECTROMAGNETIC PROSPECTING BY MEASURING RELATIVE GRADIENT OF A RESULTANT ELECTROMAGNETIC FIELD

[72] Inventor: Harold O. Seigel, Willowdale, Ontario, Canada

[73] Assignee: Scintrex Limited, Downsview, Ontario, Canada

[22] Filed: June 20, 1969

[21] Appl. No.: 835,185

[52] U.S. Cl. ...................................... 324/6, 324/4
[51] Int. Cl. ...................... G01v 3/10, G01v 3/12, G01v 3/16
[58] Field of Search .................................. 324/3–8

[56] References Cited

UNITED STATES PATENTS

| 2,220,788 | 11/1940 | Lohman | 324/6 |
| 3,490,032 | 1/1970 | Zurflueh | 324/8 |
| 3,521,153 | 7/1970 | Moss | 324/6 |
| 1,297,929 | 3/1919 | Taylor | 324/67 X |
| 1,676,779 | 7/1928 | Herr | 324/6 |
| 1,812,392 | 6/1931 | Zuschlag | 324/4 X |
| 2,268,106 | 12/1941 | Blau | 324/6 |
| 3,263,161 | 7/1966 | Ruddock et al. | 324/8 |

OTHER PUBLICATIONS

Young, C. A., Measuring the Depth of Buried Cable, Bell Laboratories Record, Nov. 1965, pp. 399–401.

Primary Examiner—Gerard R. Strecker
Attorney—Fetherstonhaugh & Co.

[57] ABSTRACT

This invention relates to a method of electromagnetic prospecting wherein a pair of detecting coils are rigidly mounted on a common support on a moving vehicle for the purpose of measuring the relative gradient of the resultant electromagnetic field. Rigidly supporting the coils on the moving vehicle renders them insensitive to misorientation of the detectors and this is of special advantage in airborne electromagnetic survey work.

3 Claims, 4 Drawing Figures

INVENTOR.
HAROLD O. SEIGEL

METHOD OF ELECTROMAGNETIC PROSPECTING BY MEASURING RELATIVE GRADIENT OF A RESULTANT ELECTROMAGNETIC FIELD

This invention relates to a method of electromagnetic prospecting wherein a subsurface area to be explored is energized with a primary magnetic field and the resultant magnetic field due to the primary magnetic field and any field that might be present as a result of currents induced in subsurface conductors by the primary magnetic field is explored at points remote from the energizing source of the primary field. Prospecting methods of this general type are well known.

The electromagnetic systems currently being used for geophysical prospecting from the air for conducting bodies in the earth fall into two broad categories (a) moving source systems wherein the primary electromagnetic field is generated by means of a transmitting coil which is transported by the aircraft, and (b) wherein the primary electromagnetic field is generated naturally, e.g., by lightning discharges, or artificially by sources exterior to the aircraft and usually fixed in location relative to the ground. These are classified as fixed-source systems. One of the characteristic shortcomings of systems in category (a) is their limited depth of detection, commonly less than 250 feet below the ground surface under the best of conditions, regardless of the size or conductivity of the subsurface conductors. As the elevation of the aircraft above the conductor is increased, the response from these conductors usually decreases almost as the inverse cube of the elevation even for very large conductors. For this reason the moving source systems have very rigid restrictions as to the conditions under which they may effectively operate. When one or more of the following conditions prevail, these moving source systems can become ineffectual: tall tree cover, rough topography, several hundred feet of overlying materials (over burden or later formations) or oxidation.

Those systems which presently fall into category (b) include the natural audiofrequency electromagnetic measurements more commonly known as AFMAG, and the use of VLF radio transmitters commonly in the frequency range of 16 to 30 kilohertz. The potential depth of penetration of such systems is much greater than that of category (a) but another factor commonly enters which limits the sensitivity of these systems. This factor is the uncertainty of orientation of the detectors relative to the field being detected. Basically all of the systems presently in use in this category employ detectors with two orthogonal coils or antennas which measure the ratio and phase difference of two orthogonal magnetic or electrical fields. Misorientation of these detectors will give rise to output variations which appear as "geometric noise" and which provide a serious limitation to the ultimate sensitivity of these systems. The usual light survey aircraft is difficult to keep with ±10° of a constant heading (particularly when making a course correction for a navigation error or when trying to fly topographic contours in very rough country) and to within 5° of roll or climb under the usual low-level turbulence conditions.

The object of the present invention is to provide a novel electromagnetic detection system, basically of the fixed source type, which (1) is largely independent of the detector orientation and, therefore, of aircraft or other vehicular navigational problems; (2) which can be employed in conjunction with a large artificial transmitter source fixed in position on the ground and employing any desired frequency, which frequency will be determined so as to be optimum with respect to the local geologic conditions, and (3) which can be used in any moving vehicle on land or water, in a drill hole and in other underground openings for electromagnetic prospecting purposes.

Generally speaking, with the method of this invention the subsurface area to be explored is energized with a primary magnetic field from a fixed energizing source as in the past but the measurement that is taken as an indication of the presence of a subsurface conductor is the gradient of a characteristic of a component of the magnetic field at a substantial distance from the energizing source of the primary magnetic field, the said gradient being sensed by simultaneously detecting the component by similarly oriented spaced-apart detecting coils.

The invention will be clearly understood after reference to the following detailed specification read in conjunction with the drawings.

In electromagnetic prospecting, one energizes a subsurface area to be explored with a primary magnetic field and compares some characteristic of the resulting field (which may also include the effects of a field caused by currents in a subsurface conductor induced by the primary field) with changes of location to locate subsurface conductors. This invention compares the gradient with changes in location of a characteristic of the resultant magnetic field to locate subsurface conductors.

The gradient of the resultant magnetic field is detected by two detector coils 10 and 12, each rigidly mounted on an end of the spacer bar 15 and having its principal axis parallel to the principal axis of the other so that they can simultaneously measure the same component of the resultant magnetic field at spaced-apart points to give a reading of the gradient of the field component.

As will be referred to again later, the measurement of the gradient of the field has advantages over many commonly used measurements in that the signal-to-background noise level ratio is high and it is little affected by orientation of the detector coil system. It is especially suited to aircraft use where maintenance of orientation of the detector is a serious problem with other methods although its use and advantages are not restricted to aircraft use.

As an example of the method, an area to be explored was energized with a primary magnetic field by laying a one turn copper wire loop with a diameter of 2 miles on the ground. The loop was laid by helicopter. The loop was energized by a motor generator set having an output of 7,500 watts at 400 cycles per second. The gradients of the amplitude and phase of the resultant magnetic field was detected at a height of about 500 feet above the ground by means of a pair of coils 10 and 11, each having its principal axis substantially vertical and spaced from each other about 15 feet as the airplane moved over the ground. Measurements were taken at distances of between one-fourth and 5 miles from the side of the ground loop.

Detector coils 10 and 12 were designed to detect a magnetic field therethrough and to generate a voltage that is proportional to the field. The design of detector coils for this purpose is well known in the art and not not referred to in detail here. Any changes in the gradient with change in location is an indication of a subsurface conductor for investigation.

It is preferred to orient the coils 10 and 12 so that they measure the component of the field in the direction of the usual maximum field although any field component can be measured.

Figure 4:
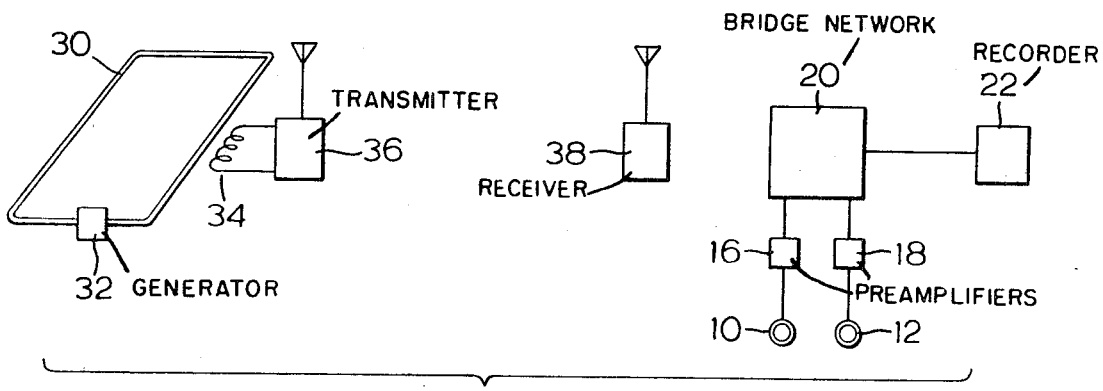
FIG. 4 illustrates a manner for energizing an area to be explored and illustrating a measuring circuit of a preferred type.

When using the large transmitting loop of FIG. 4, it is found that in the near vicinity of the loop the resulting alternating magnetic field will be largely vertical. At a distance from the loop which depends on the mean ground conductivity and the frequency employed, the field starts to tilt and eventually, at still larger distance, becomes essentially horizontal and oriented radially out from the center of the loop. This typical behavior of the electromagnetic field must be taken into consideration in the selection of the component of the electromagnetic field whose gradient is normally measured. For the near region the horizontal or vertical gradient of the vertical magnetic field component is usually measured. For the far region, the horizontal or vertical gradient of the radial (horizontal) component is preferred.

Figure 1:
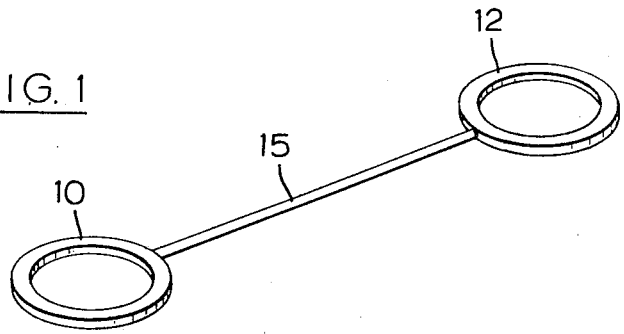
FIG. 1 is a perspective view illustrating two detection coils adapted to be mounted on a vehicle or other essentially rigid supporting structure for measuring a characteristic of resultant magnetic fields in accordance with the invention.
Figure 2:
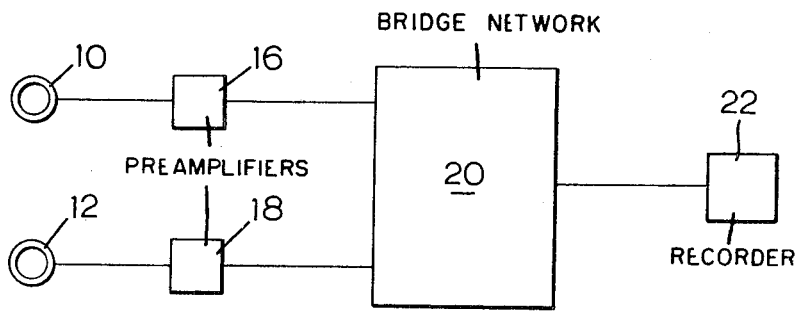
FIG. 2 is a schematic illustration of measuring apparatus according to the invention.

The metering system for recording the gradient of the magnetic field as detected by the coils 10 and 12 is illustrated schematically in FIG. 2. The outputs of the similarly oriented spaced apart coils 10 and 12 are connected to preamplifiers 16 and 18 and then fed into an automatic bridge network 20 which provides a continuous measure on a recorder 22 of the gradient of a characteristic of the resultant magnetic field as the airplane carrying the coils and the meter system moves over the terrain to be surveyed.

The design of the amplifiers, bridge circuit, and recorder are not critical things to this invention and have not been illustrated in detail. The critical concept of the invention is the concept of the method that consists essentially of measuring the gradient of a characteristic of the resultant magnetic field with changing location as an indication of the presence of a subsurface conductor. The detector coils are moved over the terrain in any conventional pattern and as they are so moved they become relatively close (usually less than 1,000 feet) from any conductor of interest that might be located under the ground. At the same time, the detector coils are usually a relatively large distance from the energizing loop or other source that creates the primary search field. In these circumstances, the gradient of the resultant magnetic field as detected by coils 10 and 12 due to the primary field is small but the gradient due to a local disturbance caused by an underlying conductor is relatively large.

Figure 3:
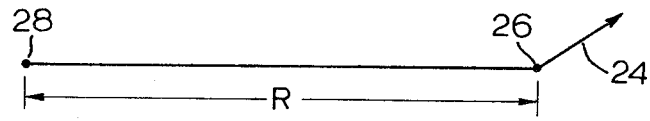
FIG. 3 is a vector diagram.

An examination of FIG. 3 is of assistance in understanding the advantages of the invention. In this figure, the numeral 24 is a vector representing a magnetic field at point 26 that is maintained by an energizing source at 28, a distance R from point 26.

The magnetic field $H$ at 26 can be represented by the expression $$H = K/R^n$$

where
- $K$ = a constant
- $n$ varies between 1 and 3 depending upon whether the radiation or induction effects of the field predominate.

If
- $H$ = field at coil 10
- $H + \Delta H$ = field at coil 12
- $d$ = spacing between coils 10 and 12 then the relative gradient of the magnetic field $$\Delta H/H = nd/R$$

If one considers that the only source of magnetic field detected by the detector coils 10 and 12 is the primary energizing loop, then the relative gradient of the amplitude of the magnetic field at the detectors is very small because $n$ is less than 3, $d$ is often less than 15 feet and not likely larger than 50 feet, and $R$ is usually upwards of a mile or even some hundreds of miles. Thus, the primary field does not give rise to a large measurable gradient at the detector coils.

On the other hand, the quantity $\Delta H/H = nd/R$ in a case where $R$ is in the order of 1,000 feet is very significant so that the effect on the resultant gradient caused by a magnetic field created by a current induced in a conductor underlying the detector coils 10 and 12 is sharp and pronounced and superimposed on a low background effect from the primary field, In result, the gradient detected by the detectors 10 and 12 will be insignificant when the detectors are not in the immediate area of a subsurface conductor but will be sharp and well defined when the detectors overlie a subsurface conductor.

Thus, a major advantage of this invention is that the primary energizing source contributes only a negligible amount to the resultant gradient and field disturbances due to geological conductors appear on essentially a "zero" background.

A further advantage of the method of this invention is that the background is negligibly affected by detector coil orientation. If the detection system is misoriented by an angle $\theta$ from the maximum field direction, the primary field gradient $\Delta H/H$ becomes ($n \cos \theta d/R$), i.e., it is reduced still further. Providing that one uses the method at a sufficiently large distance from the primary field source, the effects of orientation changes will be negligible.

The invention employs two detecting coils, both of which react in the same way to changes in orientation so that the device is not orientation sensitive. Most other systems compare two components which are at right angles to each other and they are orientation sensitive.

Embodiments of the invention other than the airborne example given will be apparent to those skilled in the art. The essence of the invention is the comparison of the gradient of a characteristic of the magnetic field with change of location at a substantial distance from the energizing source of the primary field. The characteristic need not be the relative magnitude of the signal induced in the detecting coils 10 and 12. One can, for example, measure the relative phase shift between $H$, the field at coil 11 and $H + \Delta H$ the field at coil 12. In the absence of conductors in the subsurface proximate and underlying the detector coils, there will be substantially no phase gradient between coils 10 and 12. There is often a well-defined phase gradient caused by the field from an underlying subsurface conductor because this field often differs markedly in phase from the primary field. The detection of a phase gradient between detecting coils 10 and 12 is, therefore, an indication of a subsurface conductor. This measurement has the additional advantage of being nearly zero independent of the distance from the primary field source, at least in the absence of subsurface conductors.

In the above disclosure, the gradient measurements have been referred to as though they are being made on an airborne detection system. The same measurements may, equally usefully, be made on land using a vehicle for transport, or on water using a boat.

Whereas, in the above, only the gradient in one direction of one magnetic field component has been discussed, it is quite obvious that more than one gradient direction and more than one field component may be utilized for the additional information these additional data would provide.

Localized geologic features with sharp local gradients, such as conducting ore bodies of limited strike extent, are accentuated by this method relative to large scale features such as faults and shear zones which have broad, gentler gradients, etc. The latter are of much less direct economic interest.

The simplest application of this invention is towards the use of the VLF radio transmitters, which broadcast in the frequency range of 15 to 30 kilohertz as primary sources of electromagnetic signals for the detection of subsurface conductors. These frequencies are so high for geophysical purposes, however, that in many areas surface conduction effects are so strong as to overpower the desired responses from bedrock conductors. Under these circumstances it becomes expedient to artificially generate a much lower frequency signal (e.g., 100–400 hertz). FIG. 4 shows an embodiment of one means of doing this.

A large closed loop 30 as much as several miles in diameter is laid on the ground and energized by means of a high-power low-frequency alternating current generator 32. Such a loop can be made to generate an alternating magnetic field which is sufficient for the operation of the detection system out to many miles from the loop. The detection coils 10 and 12, the preamplifiers 16 and 18, the bridge network 20 and the recorder 22 are employed as before to give a continuous reading of $\Delta H/H$ with change in location of the detectors.

With this method a significant improvement in signal-to-noise ratio may be effected by using phase-lock techniques in the detection system. In such techniques, well known to the art, a local oscillator in the bridge normally locks onto the signal output of one of the receiver coils and is used to provide an effective, very narrow band, active filter for the signal from both coils. An active filter is important because of the difficulty in rigidly stabilizing the frequency of the high power generator. When using the system illustrated in FIG. 4, it is possible to still further improve the signal-to-noise ratio by the following means. A coil 34 is inductively coupled to the transmitter loop and in its near vicinity and the signal from this coil is used to modulate a radiofrequency carrier transmitted by a radio transmitter 36. The signal from this radio transmitter is picked up by a receiver 38, which moves with the basic electromagnetic detection system, and demodulated. The demodulated signal now provides the reference for the phase-lock discrimination, in place of the local oscillator mentioned above.

A further application of the invention employs the "Afmag," i.e., the earth's natural time-varying magnetic fields as primary source. These fields are largely due to thunderstorm activity. At great distances from such centers of activity, the thunderstorms may be considered to be "fixed" sources within the present meaning of the term so far as this invention is concerned.

What I claim as my invention is:

1. The method of electromagnetic prospecting including the steps of inducing into a subsurface area to be explored a primary electromagnetic field from a fixed energizing source located at a first distance therefrom; measuring by vehicle-carried similarly oriented rigidly spaced detecting means the relative gradient of a characteristic of a component of the electromagnetic field at a second distance above said subsurface area while maintaining said second distance small as compared with said first distance whereby said relative gradient will be dominated by effects attributable to the presence of conductors in said area, said detecting means being at least a distance of a mile from said energizing source of said primary field; and repeating said measurements while moving said vehicle over said subsurface area to be explored.

2. A method of electromagnetic prospecting as claimed in claim 1 in which said characteristic of the electromagnetic field is relative amplitude.

3. A method of electromagnetic prospecting as claimed in claim 1 in which said characteristic of the electromagnetic field is phase.

* * * * *